US010688326B1

(12) United States Patent
Davis

(10) Patent No.: US 10,688,326 B1
(45) Date of Patent: Jun. 23, 2020

(54) DUAL FUNCTION FIREFIGHTING TOOL

(71) Applicant: Adam Davis, Hermosa Beach, CA (US)

(72) Inventor: Adam Davis, Hermosa Beach, CA (US)

(*) Notice: Subject to any disclaimer, the term of this patent is extended or adjusted under 35 U.S.C. 154(b) by 0 days.

(21) Appl. No.: 16/256,944

(22) Filed: Jan. 24, 2019

(51) Int. Cl.
*A01B 1/22* (2006.01)
*A62C 2/04* (2006.01)
*A01B 1/20* (2006.01)
*A01B 1/02* (2006.01)
*A62C 8/00* (2006.01)
*A01B 1/08* (2006.01)

(52) U.S. Cl.
CPC ............... *A62C 2/04* (2013.01); *A01B 1/022* (2013.01); *A01B 1/08* (2013.01); *A01B 1/20* (2013.01); *A62C 8/00* (2013.01); *A01B 1/024* (2013.01)

(58) Field of Classification Search
CPC .. A01B 1/022; A01B 1/08; A01B 1/20; A62C 2/04; A62C 8/00
USPC .................................................. 294/53.5, 49
See application file for complete search history.

(56) References Cited

U.S. PATENT DOCUMENTS

| | | | | |
|---|---|---|---|---|
| 801,557 A * | 10/1905 | Stritter | | |
| 881,782 A * | 3/1908 | Elliott | | |
| 1,264,640 A * | 4/1918 | Hall | ........................ | A01B 1/225 294/53.5 |
| 1,741,004 A * | 12/1929 | Wornstaff | ............... | A01B 1/225 294/53.5 |
| 3,074,752 A * | 1/1963 | Kirkel | ..................... | A01B 1/225 294/53.5 |
| 3,115,359 A * | 12/1963 | Hendrick | .................. | A01B 1/04 294/53.5 |
| 3,401,971 A * | 9/1968 | Cronquist | .............. | A01B 1/022 294/53.5 |
| 3,773,375 A * | 11/1973 | Nehls | ..................... | E04D 13/106 37/268 |
| 4,665,398 A * | 5/1987 | Lynch | ..................... | E21B 47/12 340/853.9 |
| 4,848,818 A * | 7/1989 | Smith | .................. | E04D 13/0765 294/181 |
| 5,105,493 A * | 4/1992 | Lugtenaar | ............... | A01D 11/00 15/141.1 |
| 5,810,408 A * | 9/1998 | Armstrong | ............... | A01B 1/00 16/422 |
| 6,315,341 B1 * | 11/2001 | Leon | ...................... | A01B 1/225 294/53.5 |
| 2002/0184713 A1 * | 12/2002 | Dallas | ..................... | A01B 1/022 7/116 |
| 2005/0015885 A1 * | 1/2005 | Johnson | .................. | B25F 1/006 7/114 |
| 2007/0145757 A1 * | 6/2007 | Wu | ......................... | A01B 1/026 294/58 |
| 2013/0233582 A1 * | 9/2013 | Frati | ..................... | A01B 1/225 172/372 |

* cited by examiner

*Primary Examiner* — Paul T Chin
(74) *Attorney, Agent, or Firm* — Pacifica IP

(57) ABSTRACT

A dual function shovel and rhino tool that allows a firefighter (or other user) to easily and quickly shift between a shovel and a rhino. The dual function tool is particularly useful in wildland firefighting since only one tool needs to be carried. The dual function tool is not limited to firefighting use but can also be used when one needs two tools in the work of operation they are performing.

7 Claims, 4 Drawing Sheets

DUAL FUNCTION FIREFIGHTING TOOL

BACKGROUND OF THE INVENTION

The present invention generally relates to a dual function tool, more particularly to a dual function firefighting tool that can be quickly changed between a shovel and a rhino.

Firefighters require multiple tools to fight wildland fires that have become quite prevalent in recent years. Among these firefighting tools are shovels and rhinos. A "rhino" is a special type of hoe that can be used to cut weeds, grass and clear land. As not specific to wildland firefighting, this dual function shovel and rhino tool can be used anytime needed to move, dig, lift, shape or cut material. It has unique features making it ideal for brush removal. When fighting wildland fires and the like, firefighters typically have to carry both a shovel and a rhino, both of which are heavy. The present invention allows a single dual function tool that easily converts from a shovel to a rhino, eliminating the need to carry two heavy tools. Furthermore, the tool is simple, yet specialized, to serve its unique purpose.

SUMMARY OF THE INVENTION

In one exemplary embodiment, a dual function firefighting tool in accordance with the present invention has an elongated pole having first and second ends, wherein a first section extending from the first end and is made of a fireproof or fire resistant material and a second section extending from the second end is made of a non-heat-conducting material; a shovel head made of a fireproof or fire resistant material attached to the first end of the elongated pole, the shovel head having a top, bottom, left and right sides; a shovel neck extending from the bottom side of the shovel head; and a sprocket-type hinge mechanism connecting the shovel head to the first end of the elongated pole, the hinge mechanism comprising a pin, spring, and two knuckles, each of the two knuckles having an opening, wherein the pin can be slid within the openings against the spring held within the knuckle to release the hinge mechanism and allow the shovel head to rotate; wherein the hinge mechanism allows the shovel head to rotate between first and second positions, wherein in a first position, the dual function tool is a shovel and in a second position, the dual function tool is a rhino.

The dual function firefighting tool can also have the first section of the elongated pole be curved and the second section of the elongated pole be straight. When the dual function tool is in a second position, the left and right sides of shovel head can be at an angle in the range of 80-100 degrees relative to the second straight section of the elongated pole. The hinge mechanism can have a sprocket-type design and the pin can have a pin head, sprocket section, smooth section, and pin stop. Steps can be formed on the bottom side of the shovel head on each side of the shovel neck. The shovel head can be moved between only two positions.

BRIEF DESCRIPTION OF THE DRAWINGS

A more complete understanding of the present invention may be obtained with reference to the Detailed Description when taken in conjunction with the accompanying Drawings.

DETAILED DESCRIPTION OF THE INVENTION

Figure 1:
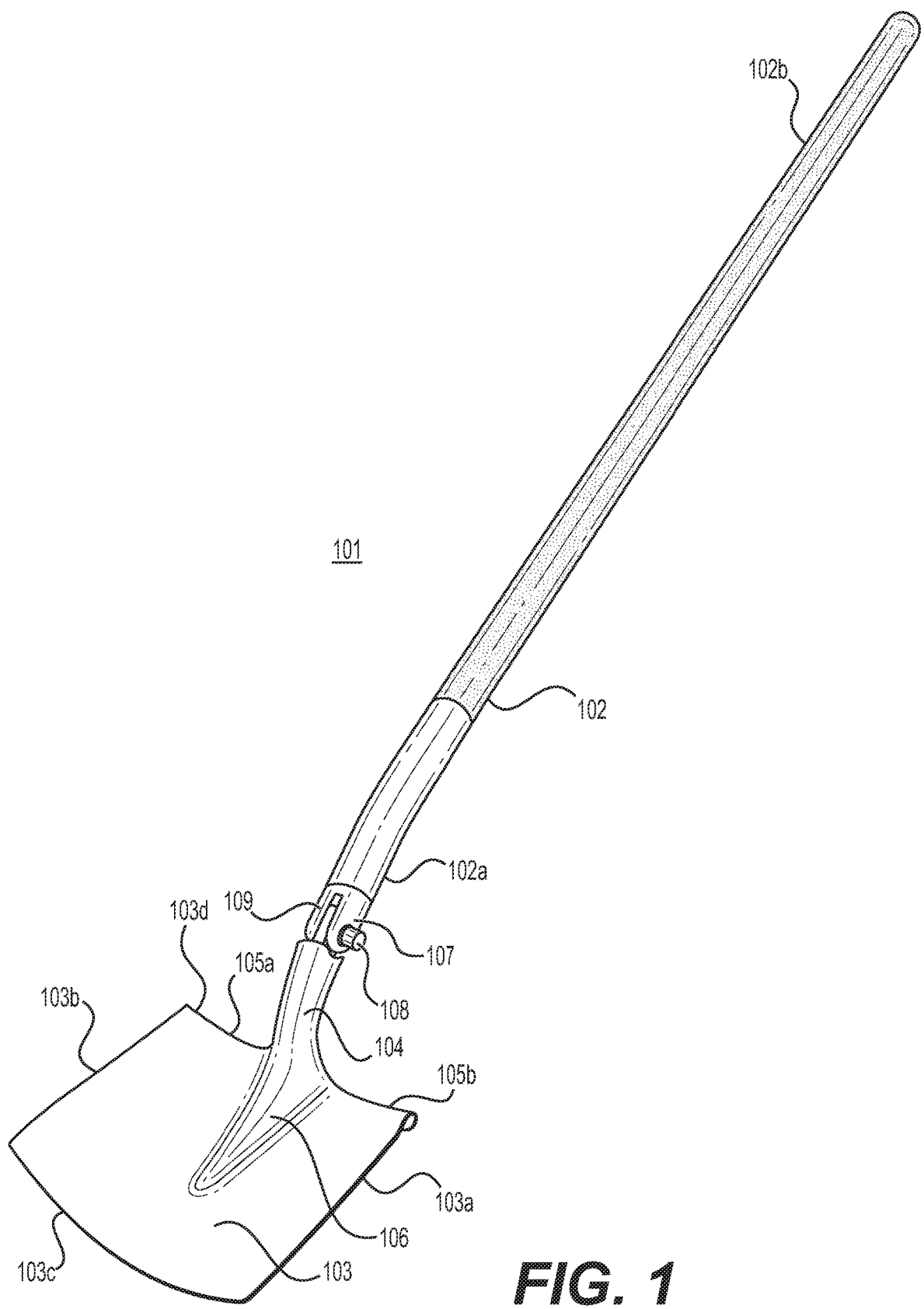
FIG. 1 shows a front perspective view of the dual function tool in the shovel position.

Turning now to FIG. 1, dual function firefighting tool 101 generally comprises an elongated pole or rod 102 with shovel head 103 attached to one distal end of elongated pole or rod 102. Shovel head 103 has four sides: a right side 103a, a left side 103b, a top side 103c and a bottom side 103d. Extending from bottom side 103d is shovel neck 104. Bottom side 103d further comprises first and second shoulders 105a and 105b, respectively, each of which extend from shovel neck 104.

Each of right side 103a, left side 103b and top side 103c of shovel head 103 can have a sharpened edge at the blade portion to facilitate cutting, removing brush, digging and shoveling. Triangular ridge 106 is formed in a center of shovel head 103 and adjacent to neck 104 to increase the structural integrity of shovel head 103.

Figure 2:
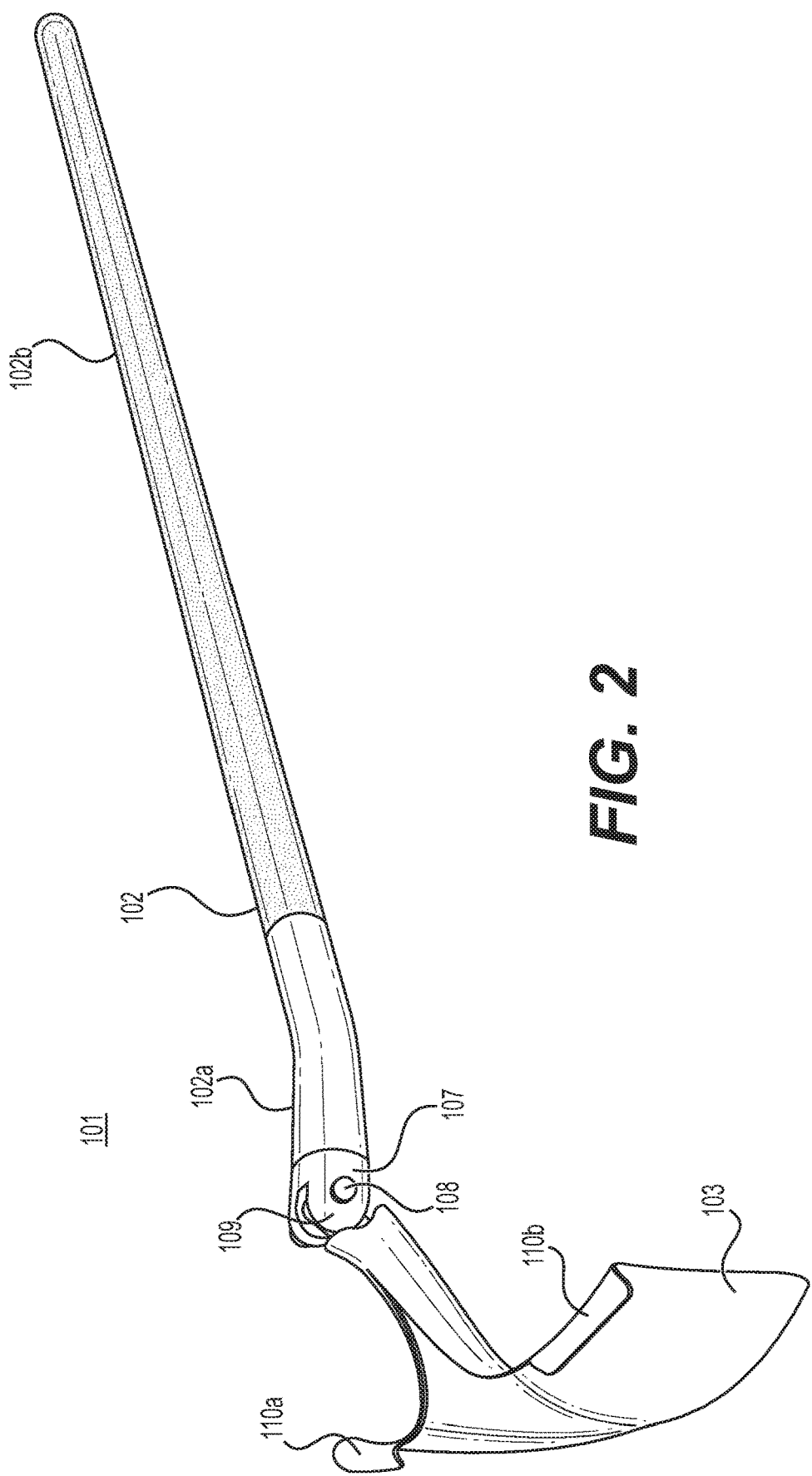
FIG. 2 shows a front perspective view of the dual function tool in the rhino position.

As shown in FIG. 2, extending away from shoulders 105a and 105b of shovel head 103 are steps 110a and 110b, respectively, to allow for a user to place his or her foot on steps 110a and 110b to dig shovel head 103 into the ground.

As can be seen in FIG. 1, top side 103c is curved or arc-shaped (with respect to bottom side 103d) with a pre-determined degree of curvature and to facilitate scraping or pushing of material and also make shoveling efficient/effective.

Connecting elongated pole 102 to shovel head 103 by way of a socket or collar 103 is hinge mechanism 107. Hinge mechanism 107 can be attached to elongated pole 102 using a hinge attachment socket or collar (at 102a) by welding. Hinge mechanism 107 and hinge attachment socket or collar 102a can also have a one-piece, or unitary structure. Hinge attachment socket or collar 102a can be attached to rod 102 by using fasteners such as a bolt, pin, rivet or adhesive materials such as a glue. Hinge mechanism 107 allows shovel head 103 to rotate about a fixed axis of rotation along a pin 108 from a first shovel position (FIG. 1) to a second rhino position (FIG. 2).

As shown in FIG. 2, elongated pole 102 has first and second ends with two sections, a curved section 102a extending from a first end and a straight end 102b extending from a second end. When shovel head 103 is in a second (rhino) position, left and right sides 103 of shovel head 103 is at a ninety-degree angle (in the range of 85-95 degrees) with respect to the straight portion. In the shovel position, left and right sides 103a and 103b of shovel head 103 at an angle in the range of 40-50 degrees with respect to straight portion 102b.

Figure 3A:
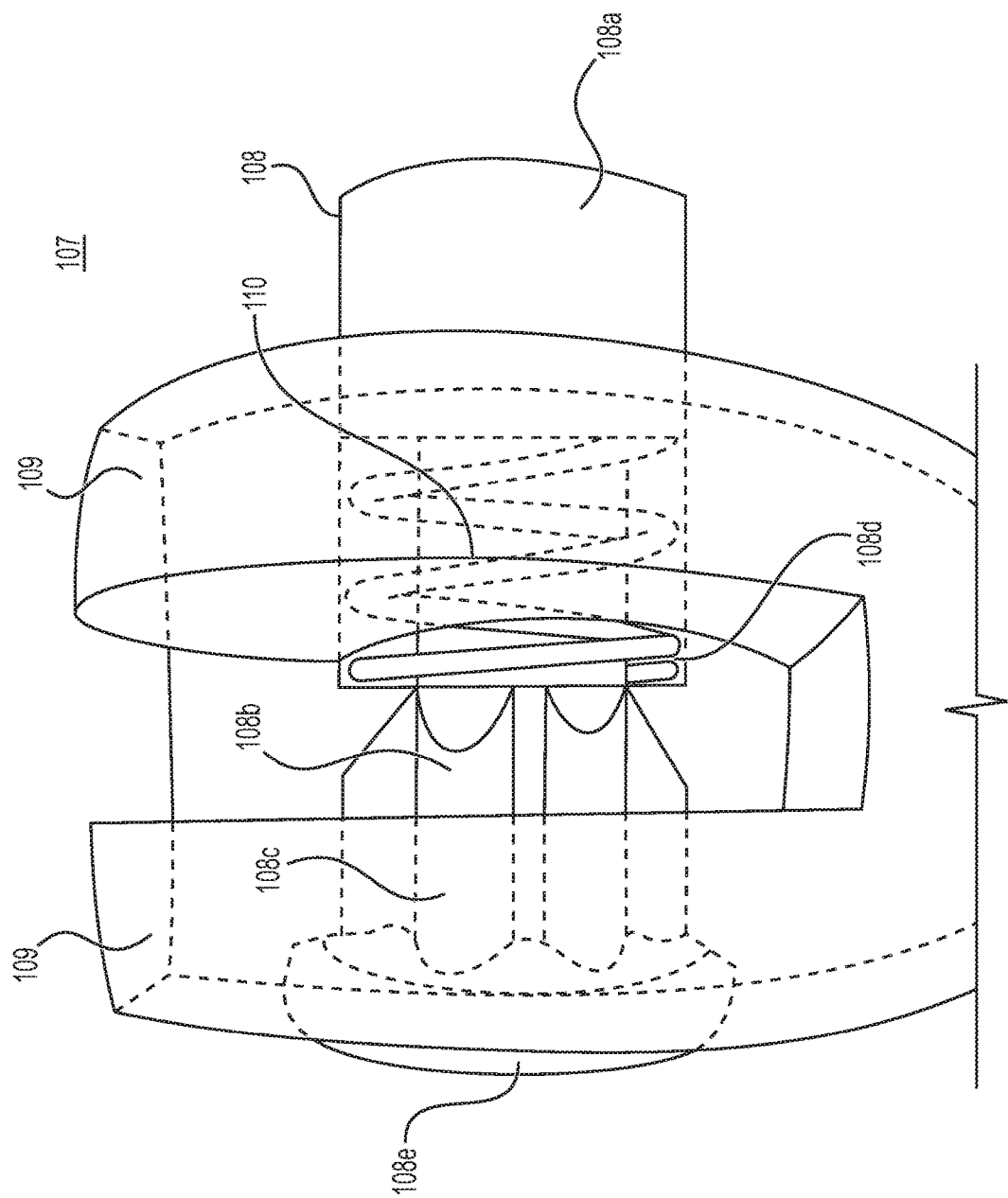
FIG. 3A shows an exemplary hinge mechanism in an engaged position with a portion cut away to view the internal components.
Figure 3B:
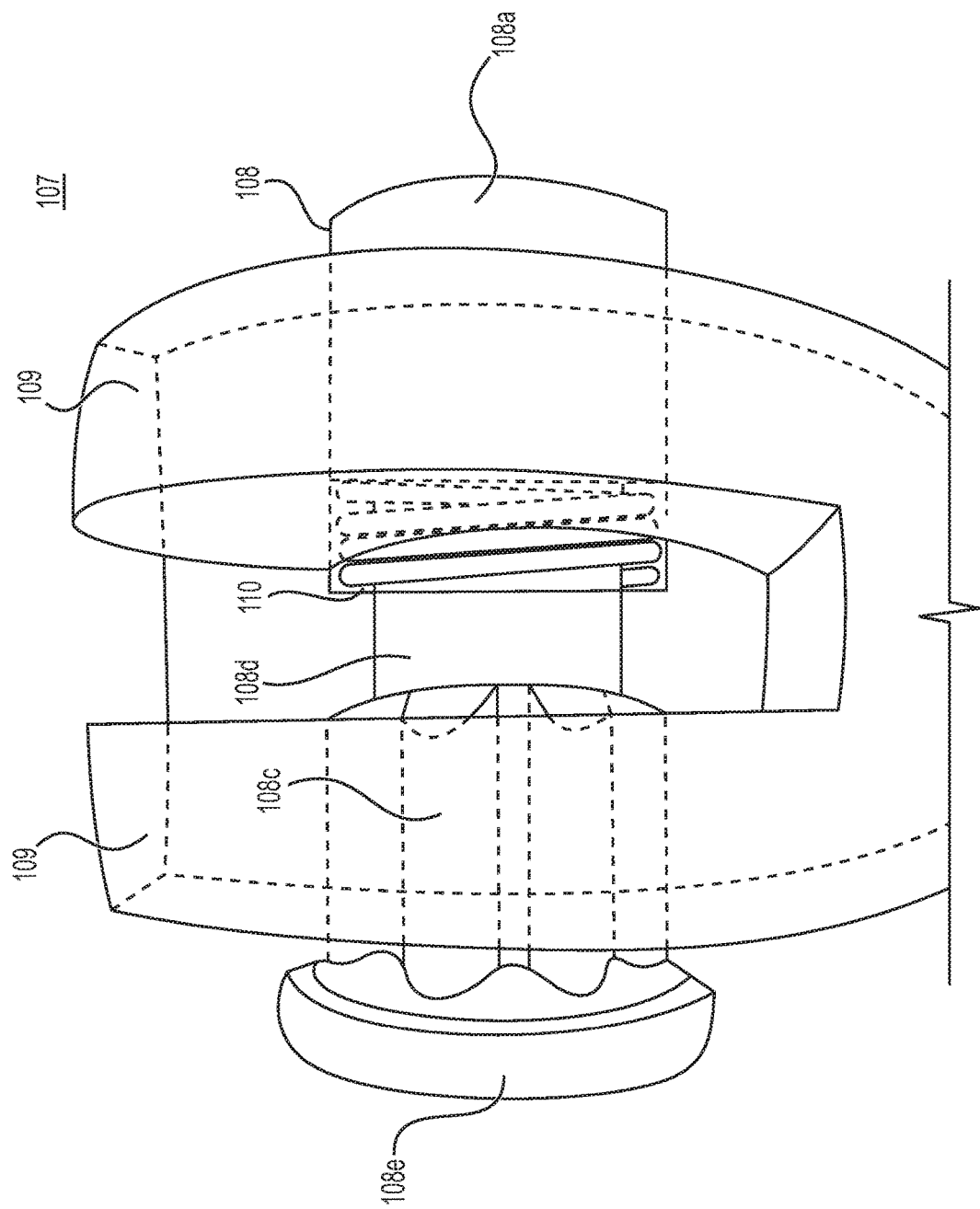
FIG. 3B shows the exemplary hinge mechanism in an unengaged position (to allow the shovel head to rotate) with a portion cut away to view the internal components.

Turning now to FIGS. 3A and 3B, an exemplary hinge mechanism is shown. Hinge mechanism 107 comprises a pin 108 and a pair of knuckles 109. Pin 108 slides through holes provided in each of knuckles 109. Hinge mechanism 109 allows for at least two distinct positions for shovel head 103: a first shovel position and second rhino position. First shovel position, as shown in FIG. 1, is one in which the dual function tool is used as a shovel. Second rhino position, as shown in FIG. 2, is one in which the dual function tool is used as a rhino (or hoe).

Hinge mechanism 107 can use a sprocket-type design, an example of which is shown in FIGS. 3A and 3B. In this exemplary pivot element, hinge mechanism 107 has a sprocket-type pin 108 comprising a pin head 108*a* and cylindrical body portion 108*b*. The cylindrical body portion 108*b* further comprises a first cylindrical body section with teeth 108*c* and a second cylindrical portion 108*d* that is smooth. Sprocket-type pin 108 can be slid along an axis extending between two holes in knuckles 109. At an opposing end of pin head 108*a* is pin stop 108*e*.

When in either shovel or rhino position, hinge mechanism 107 is held in an engaged or locked position by the force of a spring 110. When pin head 108*a* is depressed, tension to spring 110 is applied, moving the pin along the axis to allow the second cylindrical portion 108*d* (smooth portion) to align with an open section formed between the knuckles allowing shovel head 103 to rotate into the second position, rhino (hoe). Once pressure from the pin 108 is released, spring 110 presses pin 108 back into the locked position where the knuckles 109 are aligned with first cylindrical body section 108*c* to lock with teeth formed thereon.

By design of the internal sprocket type mechanism, utilizing a shaft for movement of shovel head from shovel position to rhino position, it will allow for shovel head to remain locked and secure in either position preventing from moving while in use.

Pin head 108*a* is raised to make depressing or engaging the switching from one tool to the other easy, especially with a gloved hand, such as in wildland firefighting and most operations where tool can be used.

Elongated pole 102 can be made from a variety of non-heat conductive or heat proof or resistant materials including, but not limited to wood, fiberglass, fiberglass composite or Nupla or other materials not conductive of heat. Shovel head 103, shovel collar or socket 104, hinge mechanism 107 and hinge attachment portion (at 102*a*) can be made from metal or other fire proof or fire resistant material.

While the foregoing written description of the invention enables one of ordinary skill in the art to make and use the invention, those of ordinary skill in the art will understand and appreciate the existence of variations, dual function, and equivalents of the embodiments, methods, and examples provided herein. The invention should, therefore, not be limited by the embodiments and examples disclosed here, but by all embodiments and methods within the scope and spirit of the invention as claimed.

The invention claimed is:

1. A dual function firefighting tool comprising:
    an elongated pole having first and second ends, wherein a first section extending from said first end and is made of a fireproof or fire resistant material and a second section extending from said second end is made of a non-heat-conducting material;
    a shovel head made of a fireproof or fire resistant material attached to said first end of said elongated pole, said shovel head having a top, bottom, left and right sides;
    a shovel neck extending from said bottom side of said shovel head; and
    a sprocket-type hinge mechanism connecting said shovel head to said first end of said elongated pole, said hinge mechanism comprising a pin, spring, and two knuckles, each of said two knuckles having an opening, wherein said pin can be slid within said openings against said spring held within said knuckle to release said hinge mechanism and allow the shovel head to rotate;
    wherein said hinge mechanism allows said shovel head to rotate between first and second positions, wherein in a first position, the dual function tool is a shovel and in a second position, the dual function tool is a rhino.

2. The dual function firefighting tool of claim 1, wherein said first section of said elongated pole is curved and said second section of said elongated pole is straight.

3. The dual function firefighting tool of claim 2, wherein when said dual function tool is in a second position, said left and right sides of shovel head are at an angle in the range of 80-100 degrees relative to said second straight section of said elongated pole.

4. The dual function firefighting tool of claim 1, wherein said hinge mechanism has a sprocket-type design.

5. The dual function firefighting tool of claim 1, wherein said pin comprises a pin head, sprocket section, smooth section, and pin stop.

6. The dual function firefighting tool of claim 1, wherein steps are formed on said bottom side of said shovel head on each side of said shovel neck.

7. The dual function firefighting tool of claim 1, wherein the shovel head can be moved between only two positions.

* * * * *